Oct. 30, 1945.  W. H. COLBERT ET AL  2,387,745
MIRROR AND REFLECTOR
Filed Feb. 16, 1943  2 Sheets-Sheet 1

INVENTORS
William H. Colbert.
Willard L. Morgan.
BY
ATTORNEYS

Oct. 30, 1945.   W. H. COLBERT ET AL   2,387,745
MIRROR AND REFLECTOR
Filed Feb. 16, 1943   2 Sheets-Sheet 2

INVENTORS
William H. Colbert
Willard L. Morgan
BY
Cubett, Mahoney & Miller
ATTORNEYS Patented Oct. 30, 1945

2,387,745

UNITED STATES PATENT OFFICE 2,387,745

MIRROR AND REFLECTOR

William H. Colbert, Brackenridge, Pa., and Willard L. Morgan, Columbus, Ohio, assignors, by mesne assignments, to Libbey-Owens-Ford Glass Company, Toledo, Ohio, a corporation of Ohio Application February 16, 1943, Serial No. 476,077

2 Claims. (Cl. 88—105)

Our invention relates to mirrors and reflectors. It has to do, more particularly, with the production of mirrors and reflectors having desired reflectivity characteristics and, where desired, a colored tone.

This application is a continuation-in-part of our co-pending application Serial No. 473,472, filed January 25, 1943.

Despite the wide use of mirrors in furniture, store decoration, theater decoration, sales displays, in household reflectors, as road warning signs, and as automotive mirrors, the use of such reflective surfaces has been limited by reason of the small variety of reflecting coatings available.

Thus, silvered glass mirrors of 88 to 92% reflectivity value, made with ordinary plate glass, constitute the great majority of all mirrored articles made. This type of mirror has no color although some colored mirrors have been made commercially by silvering colored glass, the color thereby secured being the color of the glass. The color of the glass arises from the fact that the glass absorbs some types of light rays more than others and the light rays which are transmitted, with the least absorption, thus impart the color to the glass. A green mirror, made with silver on the "Solex" green glass, manufactured by Pittsburgh Plate Glass Company, shows a reflectivity value, for visible light, of 61%. The use of such colored glasses is expensive and, moreover, satisfactory quality for forming mirrors is not readily available. The only other means of securing colored mirrors used in the prior art to any extent comprises the use of a coating of gold, which gives a yellow mirror reflecting 75% of the light. These mirrors are expensive and have not come into wide use. Copper mirrors, which reflect about 55% of all light, are orange-red but have not been commercialized due to the unreliable methods for their production. Colored mirrors made with fuchsin or methyl violet dyestuffs have been suggested as mirror-type coatings but such mirrors are very dark due to a reflectivity of less than 12%. Mirrors of this type are also not stable, the films rapidly breaking up and spotting, and in service the color soon changes to muddy non-reflective grays. As a result, they have had no commercial use in spite of the demands for colored mirrors.

Mirrors made with platinum, iridium, or aluminum are silvery in appearance and without color, while those made with chromium, silicon or the usual opaque lead sulfide are dark and without color tone. The prior art lead sulfide mirror reflects about 30% of light and each of the other mirrors is characterized by a fixed reflection value. Glass coated with asphalt or black paint as well as mirrors of black opaque glass show a reflectivity of about 5%.

It is thus apparent that only a few alternatives are offered, in the way of reflectivity values, as regards possible mirror surfaces, and that few of these mirror surfaces are colored. The reflectivity values exhibited in each case are fixed and the production of mirrors of any desired reflectivity value has not been possible.

One of the objects of our invention is to provide mirrors or other reflective surfaces of a wide range of reflectivity percentage characteristics which can be controlled as desired.

Another object of our invention is to provide mirrors or other reflective surfaces not only of a wide range of reflectivity percentage characteristics which can be controlled as desired but also of a wide range of color tones which can be controlled as desired.

A still further object of our invention is to provide mirrors or other reflective surfaces in which light crosses or other light diffraction effects are made to appear or are entirely eliminated depending upon the nature of our mirror film.

Various other objects will be apparent in the following description.

The accompanying drawings will aid in understanding our invention. In these drawings.

Figure 1:
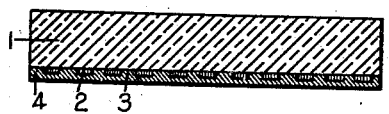
Figure 1 is a transverse section of a mirror made according to our invention and embodying an irregular reflective pattern.

According to our invention mirrors of desired reflectivity value are produced by depositing upon the surface of a suitable support, such as glass, small areas or spots of opaque mirror surface and the remaining small areas or spots on the surface of the support are either left uncoated or are filled in with another material of different reflectivity values, this latter material being color-producing where color tones are desired. The total reflectivity value of the mirror or reflector will be determined by the reflectivity value of the total area of small opaque areas or spots plus the reflectivity value of the total area of the small areas or spots which are uncoated or coated with the other material of different reflectivity value. The small areas or spots are made sufficiently small and are so spaced that the mirror surface will appear as a continuous mirror film having a desired color.

While all prior art mirrors have been made with opaque reflective films that covered the entire surface of the glass or other transparent support, we have found that the incomplete coating of the surface of the glass or other support with reflective spots or other small areas of opaque mirror surfaces permits us to make reflectors of any desired reflectivity value. Thus, if silver dots which are individually very small and of 85% reflectivity value cover 25% of the glass surface, a 20% reflecting mirror will result.

If the uncoated areas are filled in with transparent or opaque materials of various colors, the mirrors acquire distinct color tones depending upon the color of such materials. The uncoated areas surrounding the reflective areas may also be filled in with another reflective coating leading to further possible variations in total reflectivity values and in colors, if such coating is of a type to give off color.

In order to secure any desired reflectivity value by incomplete covering of the surface of the glass with any of the known reflecting materials, we deposit these on the glass or other support in small areas or spots distributed generally all over the surface of the glass in either a regular pattern or a highly irregular predetermined design depending upon the results desired. As it is desired that the uncoated and discreet reflective areas should blend and not be particularly discernible to the eye at distances at which the mirror is normally viewed, we have found it desirable that the dots of reflective material which may be square, round or other regular or irregular shapes, should be preferably not larger than 0.025 inch in largest dimension. We find dots or other areas of about .010 to 0.001 inch very desirable. Instead of our mirror pattern being present as reflecting spots our reflective material may be used as a continuous pattern made of relatively thin lines surrounding small dot areas, the latter of which are essentially clear to permit passage of light or which may be filled in with a transparent colored lacquer or opaque colored paint or other reflective type colored or uncolored coating. The continuous lines will be of a width less than 0.025 inch at their widest point.

We find that where a pattern of spots or continuous areas is used which is of a symmetrical nature, our mirrors and reflectors show bright light crosses upon them when reflecting a distant light, although such effects may not be noticed when used as reflectors within doors. Where it is desired that the mirrors be free of such bright crosses or other diffraction effects we have found it necessary to develop special patterns lacking any symmetry, the reflecting areas being present in an irregular predetermined pattern.

In the following description we have given several examples of ways in which our mirrors may be produced. However, it is to be understood that various other methods may also be used.

*Example 1*

Figure 2:
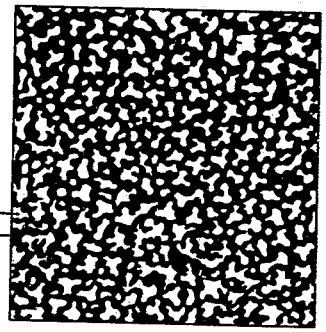
Figure 2 is a plan view of the mirror of Figure 1 showing the pattern.

Ordinary plate glass is thoroughly cleaned and then silvered all over by any of the usual means, such as by deposition from alkaline silver nitrate solutions by reduction with dextrose. After drying, a procedure of photoengraving of the mirror coating is followed. The mirror surface is coated with a light sensitive varnish, and the desired pattern of spots is produced, in accordance with our invention, on this light sensitive varnish film by contact or projection light exposure through a negative containing the desired pattern. The areas of varnished film not exposed to the light are developed out, leaving exposed areas of the bare mirror film which are then removed by etching. Then the light-sensitive varnish film remaining over the patterned mirror area of dots is removed by a solvent and the patterned mirror film and support are dried. As a specific example and as illustrated in Figures 1 and 2, silver dots 2 of 0.009 inch covering 31% of the total area were produced on a sheet of glass I following the above procedure. The dots are of irregular shape and arranged upon the glass in such a way that their placement was highly irregular and without any symmetry similar to the arrangement shown in Figure 2. Due to some undercutting the dots each individually apparently reflected at a value of about 70% and the mirror as a whole reflected 21.9% of the incident light. A pattern of the general nature shown in Figure 2 was used taking care that the actual area of all the dots in the pattern covered 31% of the total area. The remaining clear glass areas 3 were either left uncovered to permit passage of light or were filled in with a continuous adhesive layer 4 carrying a dark black flock to absorb light. These areas 3 may be filled in with other substantially non-reflective material of desired color or with material of different reflective properties with or without color.

*Example 2*

Figure 3:
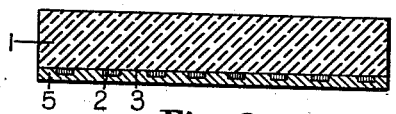
Figure 3 is a view similar to Figure 1 but showing a slightly different type of mirror.

The patterned glass, as produced in Example 1, carrying silver dots and open clear areas is backed by a continuous coating 5 (Figure 3) consisting of a red or yellow paint. A blue paint may also be used. According to the color of the paint employed, we secure mirrors of a red, yellow, or blue tone respectively. Using a blue paint we secured a blue mirror of 23% total reflectivity which is useful as a decorative store front. Due to the dots being arranged in the highly irregular manner no dazzling diffraction crosses of light appear on these mirrors which would be objectionable in their use as a store front. The reflectivity value of 23% is sufficiently low that the store front does not glare in the sunlight. At a distance of a couple of feet from the mirror face, the mirror appears to be entirely uniform as the eye cannot resolve the small dots into separate images.

*Example 3*

Figure 4:
Figure 4 is a view similar to Figure 1 but illustrating a slightly different type of mirror.

We find the use of a reflecting material of lower reflectivity value, such as lead sulfide which generally falls within 30 to 35%, to frequently be of particular utility for the formation of our special mirrors. Furthermore, as silver, gold and copper mirrors are more expensive and difficult to produce and more subject to failure in service than the lead sulfide mirrors, the latter are of particular attractiveness. Thus, we may form a mirror surface in which the total lead sulfide mirror area covers approximately 55% of the glass surface as shown in Figures 4 and 5.

Figure 5:
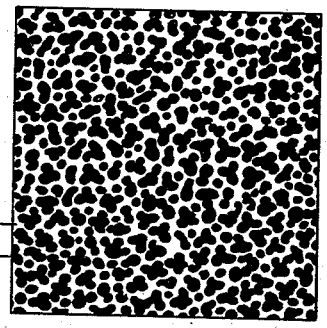
Figure 5 is a view similar to Figure 2 but illustrating a different type of irregular pattern.

In producing this mirror, a pattern is used of the general nature shown in Figure 5 which is a magnified view of the pattern. The lead sulfide is present on the glass support 6 as an irregular continuous pattern made of relatively thin lines 7 surrounding small irregular dot areas 8, varying in dimensions from .001 to .005 inch across, which are essentially clear to permit passage of light or which may be filled in by means of a layer 9 of a transparent red lacquer to absorb light. In either case, if the clear transparent dot areas comprise 45% of the surface and the lead sulfide 55% of the surface, the resulting reflectivity value for the entire mirror is found to be 18%.

In producing this mirror, commercially available substantially colorless plate glass was first tested to indicate areas of the required mirror size that are parallel to within 32 seconds of arc and these areas are cut out to form support 6. By choosing glass showing such parallelism, double images in the mirror produced may be avoided. An all-over mirror film of lead sulfide was next produced on the surface of the glass by the usual method, such as those disclosed in Colbert et al. Patents 1,603,936 of October 19, 1927, 1,647,857 of November 1, 1927, and 1,662,564 of March 13, 1928. The finished all-over mirror film was coated with a varnish film sensitive to light, and the correct pattern was produced on this light sensitive varnish film by contact or projection light exposure through a negative containing the pattern. The areas not exposed to the light were developed out leaving exposed areas of the bare mirror film which were then removed by etching. Then, the light-sensitive varnish film remaining over the patterned mirror area was removed by a solvent and the patterned mirror film and support were dried. The patterned mirror film was then coated with a vehicle containing red dye. We prefer to use a high viscosity nitrocellulose lacquer containing leveling agents because it is important that this red film 9 be uniform and flat, and for low cost manufacture it should be sprayed rather than otherwise applied. Other coatings may be used just so they have the properties of drying out to a film that is uniform and flat and not deleterious to the mirror film.

Figure 6:
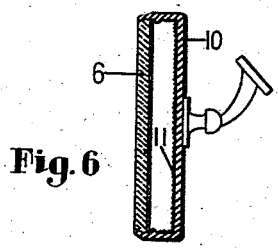
Figure 6 shows a mirror, made according to our invention, mounted in a holding frame.

The mirror of this example may be mounted in a supporting frame 10 for use as an automotive rear view mirror, as shown in Figure 6. The frame, in back of the mirror itself, may be coated with any black material 11, such as a black flock, adhered to the metal by a glue. In night driving when intense light strikes the mirror, the amount of light not absorbed or reflected by the support 6, the lead sulfide mirror area 7, and the red film filter areas 9, is transmitted through the red film filters and is absorbed by the black flock absorbing medium 11 in the frame back of the mirror. Black velvet or other well known absorption media can be used instead of black flock, but black flock is preferably used because it is inexpensive and simple to apply. The mirror of this example is useful as a non-glaring rear view mirror in automobiles and in use the dots 8 and pattern 7 are not directly noticeable when viewing images therein.

*Example 4*

Figure 7:
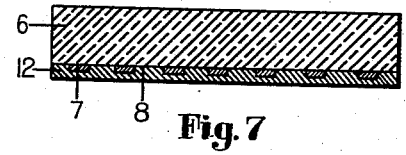
Figure 7 shows a mirror slightly different from that of Figure 4.

The mirror of Example 3 may, instead of being filled in with a transparent red lacquer and being mounted in the frame indicated, be given a protective back coating 12 (Figure 7) of a black lacquer. This is applied on the patterned coating 7 of lead sulfide all over its back surface. As these black lacquer coatings on glass are generally of about 5% in reflectivity value, when used alone, and as 45% of the surface of the mirror is of this type while 55% of the surface is coated with lead sulfide, the general reflective value of the mirror, as a whole, is 20% and is within the range we desire for an automotive rear view mirror.

The dots in each of the above examples are placed in an irregular fashion, as shown by way of example in Figures 2 and 5, although other irregular arrangements are possible. By so arranging the patterns in an irregular way and using irregular reflective dots or open areas, it is possible to avoid the appearance of white crosses or diffraction patterns on the mirror during use. Figure 2 illustrates a pattern type of one nature which has been found successful in overcoming this trouble where desired. This figure, as previously stated, further illustrates the relationships of the dots 2, indicated in white, which may be of a suitable reflecting medium, and the clear or light-absorbing areas 3, indicated in black. In some instances, it may be desirable to have areas 3 coated with reflective material different from that of the dots 2. Figure 5 shows a pattern in which the converse arrangement is provided. That is, the dots 8, indicated in black are the light-absorbing or substantially non-reflecting material and the surrounding areas 7, indicated in white, are the reflecting or mirror areas. However, the dot areas 8 may be coated with material of a different reflective power from that of the areas 7. The support for the mirror film, used in making the second surface mirrors, need not necessarily be of glass but may be of any transparent solid material, such as plastic or resinous substances which are transparent or translucent.

*Example 5*

Figure 8:
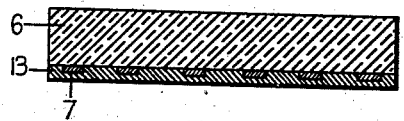
Figure 8 shows a mirror similar to that of Figure 7 but having a mirror film consisting of areas of lead sulfide and areas of gold.

The patterned glass of lead sulfide reflective areas 7, as produced in Example 3, before application of the transparent red lacquer 9 is taken and carefully cleaned on the back. The back is then mirrored by chemical deposition with an opaque film 13 (Figure 8) of gold using any of the known formulae for producing gold mirrors. A mirror is thus produced in which the small continuous areas of lead sulfide cover 55% of the entire area and the irregular dot areas enclosed by the lead sulfide appear in yellow gold mirror. As the gold covers 45% of the surface, it supplies 33.7% reflectivity (.45×75) and the lead sulfide supplies 16.5% reflectivity (.55×30) giving a mirror of a total reflectivity of 50.2% and of a yellow color tone. It is apparent that by suitably arranging the relative ratios of the areas covered by the two types of reflectors that we may prepare mirrors of a wide range of reflectivity values and of any desired reflectivity value.

*Example 6*

Figure 9:
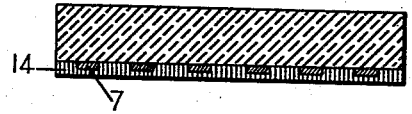
Figure 9 is a view similar to Figure 8 showing a mirror having a mirror film consisting of areas of lead sulfide and areas of silver.

If in the above example we cover the lead sulfide areas 7 with a backing 14 of silver (Figure 9), we secure a different mirror of different reflective value. Thus, after carefully cleaning the lead sulfide back surface, a silver deposit is formed all over the back by the use of any of the usual chemical silvering formulae, such, for example, as the formulae utilizing the reduction of silver nitrate with alkaline solutions of reducing sugars, such as dextrose. A mirror of 57% total reflectivity results and at a short distance from the mirror surface, it is not apparent to the eye that the mirror is not uniformly mirrored with one substance instead of discontinuously with two different types of mirror film. The silver areas give 0.45×90% or 40.5% reflectivity and the lead sulfide areas 0.55×30% or 16.5% reflectivity, which added together to give the total 57% reflectivity value found for this mirror.

*Example 7*

Figure 10:
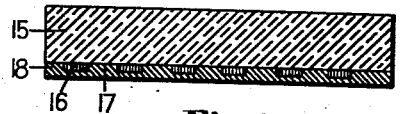
Figure 10 is a view similar to Figure 9 showing a mirror which will have a blue color.
Figure 11:
Figure 11 is a transverse sectional view illustrating a first-surface mirror made according to our invention.

If we wish to make a blue tone silver mirror of 57% reflectively, we may first silver a glass 15 (Figure 10), using the ordinary solutions, and then form a continuous pattern of silver lines 16 and open clear spaces of an irregular nature and arrangement, similar to that shown generally in Figure 5, by patterning and photoengraving in the general way described in Example 3. A pattern is used which will leave the silvered areas covering 60% and leave 40% of the areas open. The open irregular dot areas are then filled in with a blue paint which may be applied as a continuous film on the back of the mirror. Such a mirror is of use in store advertising fixtures, or wherever a higher reflectivity is desired, as contrasted with the mirror of Example 2. Such a mirror will have a blue cast.

*Example 8*

Following the methods of producing Example 1, a pattern film of silvered dots or aluminum dots 19 is produced on the upper surface of a glass support 20. This may be made as a first surface mirror of 18 to 22% reflectivity value by controlling the total area mirrored with these materials in the form of small dots of .004 inch diameter. In this example, it is not necessary that the surfaces of the support 20 be closely parallel.

We may deposit upon the glass surface a continuous film of either silver or aluminum by thermal evaporation of these metals inside a high vacuum and secure mirrors of approximately 90% reflectivity value with either of the two metals. These films may then be coated with a photo-sensitive varnish and a pattern of small dots projected thereon, in the manner previously described, which dots may cover from 20 to 24.5% of the total surface. After the surrounding areas are etched away and the metals are left only in small dots, the photo-resist is then removed from the dots and the mirrors are cleaned and dried.

Reflection of light directly from the surface of the glass carrying the reflecting metallic dots, in a pattern arrangement of this nature will be found to range between 18 and 22%. In the case of such reflection from a first surface, as in this example, there is no double image as the light rays do not have to pass through the glass before striking the reflecting metallic surface. Thus, the glass used for making these mirrors does not have to meet the requirements for parallelism which the glass of the second surface mirrors described above should preferably have. First surface mirrors, however, are much more sensitive to becoming scratched in service and a protective coating 21 of clear lacquer or resinous material must be placed over the mirrors of this example. If in preparing the mirror of this example, we use a colored glass as the support we introduce a color tone into the first-surface mirror formed. It is apparent that we may also use colored glass as the support in producing our second surface mirrors of the previous examples and in such a way we may secure colored second-surface mirrors.

*Example 9*

In some cases we have found that the appearance of the diffraction crosses of white light would be useful in our mirrors. Thus, in road sign reflectors warning of dangerous road conditions, the appearance of a brilliant glaring white cross on the sign immediately calls the approaching drivers' attention to the sign.

To produce such a warning sign of high reflectivity, we cover the surface of a glass sheet 22 (Figure 12) with silver mirror either by chemical deposition or thermal evaporation. A pattern of regular sized dots 24 arranged symmetrically in rows or a pattern of square or diamond shaped dots separated by symmetrical lines is produced on this silvered sheet of glass by photoengraving, as previously explained. A square dot pattern of a suitable type is shown in Figure 13.

Figure 12:
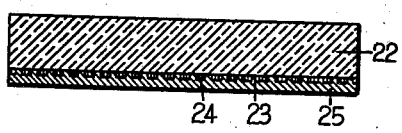
Figure 12 is a transverse sectional view of a mirror made according to our invention embodying a regular reflective pattern.
Figure 13:
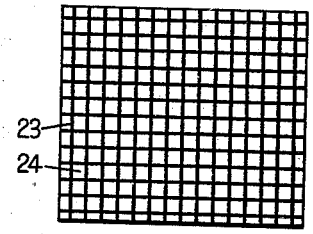
Figure 13 is a plan view of the mirror of Figure 12 showing the regular reflective pattern.

In Figures 12 and 13, we illustrate a mirror of such pattern. In this instance, the pattern on the support 22 consists of square dots 24 which are of reflective material and are surrounded by continuous areas 23 which may be clear or filled in with material of different reflective power and, if desired, of color. The dots 24 may be of silver, lead sulfide or other suitable reflective material. The area of the dots relative to the area of the continuous lines and the nature of these two areas will determine the total reflective power of the mirror. The entire back of this mirror may be covered with a protecting layer 25 of black lacquer or asphalt paint.

*Example 10*

Figure 14:
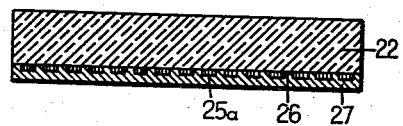
Figure 14 is a view similar to Figure 12 but illustrating the reverse of the pattern of Figure 12.
Figure 15:
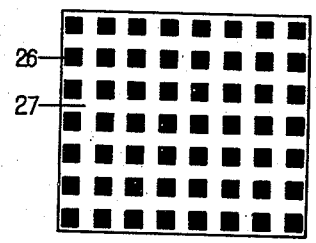
Figure 15 is a view similar to Figure 13 but illustrating the reverse of the pattern of Figure 13.

We prefer, however, as in Figures 14 and 15, in contrast to Example 9, to have the silver constitute the continuous pattern area 27 surrounding the clear uncoated areas or dots 26 which are etched out. By having the silvered area total 72% and the clear dots 28% we secure a mirror of 73% total reflectivity value when the clear areas are filled in by covering the entire back with a layer 25a of black lacquer or asphalt paint. A simple pattern of the general nature of Figure 15, suitable for producing this example, comprises the use of regularly arranged open squares of 0.0013 inch in length and breadth spaced apart in each direction by 0.012 inch. The clear areas may be filled in with other materials of different reflective value from the silver areas which may or may not be of a nature to produce color. Mirrors of different reflectivity values are thereby secured.

*Example 11*

Figure 16:
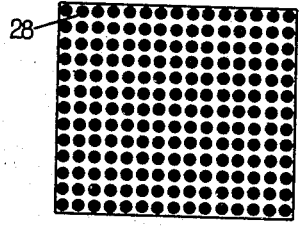
Figure 16 is a view similar to Figure 13 but illustrating a slightly different type of regular pattern.

In Figure 16, we illustrate a mirror which has a regular pattern. The arrangement is substantially like that of Figure 15 with the exception that the dots 28 are circular instead of square. The same result will be obtained with uniform round dots, or uniform dots of any shape, as with the square dots.

*Example 12*

Figure 17:
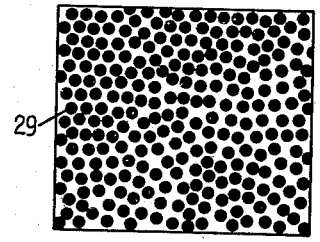
Figure 17 is a view similar to Figure 16 but illustrating an irregular pattern.

In Figure 17, we show an irregular pattern. The dots 29 are of circular form and of uniform size but are non-uniformly distributed. The areas around the dots may be of any desired reflective material. The dots may be clear or of different reflective material. The same results can be obtained with uniform dots unevenly distributed, as in this example, as were obtained with the irregular patterns of Figures 2 and 5. The total reflectivity of the mirror will depend on the total areas of the dots and surrounding spaces and the nature thereof.

*Example 13*

Figure 18:
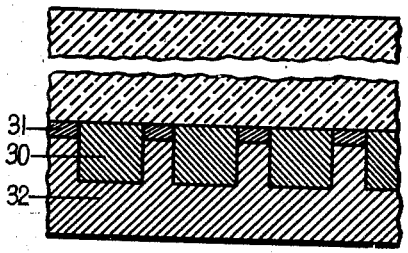
Figure 18 is a transverse section illustrating another type of mirror made according to our invention.

A colored mirror may be made, as shown in Figure 18, by taking the mirror of Example 3, prior to the filling in of the clear areas with the transparent red lacquer. The patterned glass carries a patterned coating 30 of lead sulfide all over its back surface. The lead sulfide covers 55% of the surface. The clear areas which comprise 45% of the surface are then filled in with a specially colored mirror deposit 31 in which the color is developed by light interference effects as more clearly set forth in our co-pending applications Serial Nos. 473,473, and 473,474, filed January 25, 1943. For example, in order to secure a mirror with a mauve or reddish purple tone the glass with the opaque lead sulfide pattern on it is thoroughly cleaned and rinsed and the clear areas are then covered with a very thin semi-transparent lead sulfide film in the manner discussed in Examples 1 to 16 of said co-pending application Serial No. 473,474. The areas 31 will have color in them developed by light interference.

The mirror thus produced shows a definite red-purple shade and a reflectivity which is the sum of the reflectivity values arising from the two types of mirror films present. Thus, from the opaque lead sulfide mirror coating 30 which covers 55% of the area we secure 16½% reflectivity, as this mirror coating has a reflectivity value of 30%. The thin red deposit of semi-transparent lead sulfide has a reflectivity value of 21.6% and as it covers only 45% of the total area it supplies 9% total reflected light. The mirror, as a whole, has a total reflectivity value of 25.5% and has a pleasing red-purple color. When viewed at a distance greater than 18 inches away the pattern cannot be readily discerned and the mirror appears to be of a continuous uniform type of coating, giving a continuous image. The back of the mirror may be protected with a continuous opaque coating or layer 32.

Any of the other patterns discussed in the previous examples or the following example may be used. Furthermore, the interference film 31 may be produced from various materials as set forth in said co-pending applications, and mirrors of various colors can be secured depending upon the thickness of this film 31 and the relation of the percentage of the total surface area of the mirror which this color producing area constitutes.

*Example 14*

In all of the previous examples, we have specified that one of the areas of the mirror surface is opaque. However, this is not necessarily so. It is possible to produce two different types of semi-transparent areas in the manner indicated in the discussion of Example 13. These two areas both will have color due to light-interference effect. They may differ from each other in color effect or may be of the same color effect and differ from each other in reflective power.

Any of the patterns discussed in the preceding example or the following example may be employed in this arrangement. The total reflective power of this mirror will depend on the amount of area covered by each type of film and the reflective power of each type of film.

*Example 15*

Figure 19:
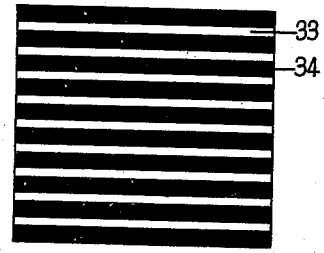
Figure 19 is a plan view of a mirror, made according to our invention, using a straight-line pattern.

For some advertising effects the use of our mirror films as small strip areas of not over .025 inch alternating with clear areas of about the same dimensions have been useful. Thus, as shown in Figure 19, a pattern of alternate stripe lines of lead sulfide mirror film 33, each 0.012 inch wide, and of clear open lines 34, 0.018 inch wide, can readily be produced in the ways already described. As a mirror, this mirror shows a reflectivity value of 12% as the lead sulfide covers 40% of the entire surface. As an example of a use for a mirror of this type, if a picture is mounted a few inches behind the mirrored glass, which forms the front surface of a box, and a light is placed in the box so as to illuminate the picture, the picture will be visible when so illuminated. If the light is continuously turned on and off the passerby will alternately see the picture, when so illuminated, and, when the light is off, will apparently view an opaque reflective mirror face.

Other arrangement of stripe patterns will be apparent from the previously described examples. Such patterns may consist of alternate stripes of uniform or non-uniform widths and of materials of different reflectivity.

It will be apparent from the above description that we may produce mirrors of any desired reflectivity values. We accomplish this by the use of mirror films on suitable supports, the film being arranged in a predetermined pattern, either regular or irregular depending upon the purpose for which the mirror will be used. Certain areas will be coated with opaque reflective material of desired reflectivity and other areas will be left clear or will be coated with other material of different reflectivity value, the latter material being color-producing where color tones are desired in the mirror. The pattern used will always consist of sufficiently small areas of different materials and so spaced that at normal distances of use, the mirror will appear to have a continuous coating of reflective material.

Various other advantages will be apparent from the preceding description and the following claims.

Having thus described our invention, what we claim is:

1. A mirror presenting a continuous, uniform reflective surface and image to the eye at a short distance therefrom, and wherein said image is free of bright diffraction crosses of light; said mirror comprising a support and a mirror coating consisting of small, irregularly shaped areas not exceeding 0.025 inch in largest dimension incompletely covering the surface of the support and irregularly arranged without any symmetry, said surface having a second mirror coating material of different reflective value, comprising adjacent areas of irregularly contorted shape and similarly small dimensions, said mirror showing an over-all reflectivity falling between the reflectivities characteristic of the two reflective materials.

2. An automobile rear view mirror presenting a continuous, uniform reflective surface and image to the eye at a short distance therefrom, and wherein said image is free of bright diffraction crosses of light; said mirror comprising a support and a mirror coating consisting of small, irregularly shaped areas not exceeding 0.025 inch in largest dimension incompletely covering the surface of the support and irregularly arranged without any symmetry, said surface having a second mirror coating material of different reflective value, comprising adjacent areas of irregularly contorted shape and similarly small dimensions, said mirror showing an over-all reflectivity falling between the reflectivities characteristic of the two reflective materials.

WILLIAM H. COLBERT.
WILLARD L. MORGAN.